United States Patent
Babcock et al.

(10) Patent No.: US 10,829,682 B2
(45) Date of Patent: Nov. 10, 2020

(54) MISCIBLE SOLVENT ASSISTED GRAVITY DRAINAGE

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 15/383,023

(22) Filed: Dec. 19, 2016

(65) Prior Publication Data

US 2017/0292354 A1  Oct. 12, 2017

Related U.S. Application Data

(60) Provisional application No. 62/319,856, filed on Apr. 8, 2016.

(51) Int. Cl.
| | |
|---|---|
| *C09K 8/58* | (2006.01) |
| *E21B 43/16* | (2006.01) |
| *C09K 8/584* | (2006.01) |
| *C09K 8/594* | (2006.01) |

(52) U.S. Cl.
CPC .............. *C09K 8/58* (2013.01); *C09K 8/584* (2013.01); *C09K 8/594* (2013.01); *E21B 43/16* (2013.01)

(58) Field of Classification Search
None
See application file for complete search history.

(56) References Cited

U.S. PATENT DOCUMENTS

| | | |
|---|---|---|
| 3,035,637 A | 5/1962 | Allen |
| 3,316,965 A | 5/1967 | Watanabe |
| 3,319,712 A | 5/1967 | O'Brien |
| 3,368,627 A | 2/1968 | Hurst et al. |
| 4,490,985 A | 1/1985 | Wells |
| 4,511,381 A | 4/1985 | Mehra |
| 6,230,814 B1 | 5/2001 | Nasr et al. |

(Continued)

FOREIGN PATENT DOCUMENTS

| | | |
|---|---|---|
| DE | 102014010105 A1 | 1/2016 |
| FR | 2466606 A1 | 4/1981 |

(Continued)

OTHER PUBLICATIONS

M. Asadi et al., "Water-Free Fracturing: A Case History", Society of Petroleum Engineers, SPE-175988-MS, 14 Pages.

(Continued)

*Primary Examiner* — William D Hutton, Jr.
*Assistant Examiner* — Charles R Nold
(74) *Attorney, Agent, or Firm* — Patterson + Sheridan, LLP

(57) ABSTRACT

A method for enhanced or improved oil recovery includes injecting a miscible injection fluid comprising an unfractionated hydrocarbon mixture through an injection well into a hydrocarbon bearing reservoir at a structurally higher position to initiate gravity-stable displacement and gas cap expansion processes. Residual hydrocarbons in the hydrocarbon bearing reservoir are mobilized and displaced by the miscible injection fluid to a structurally lower position within the hydrocarbon bearing reservoir adjacent a production well through which they are produced to the surface.

20 Claims, 8 Drawing Sheets

(56) References Cited

U.S. PATENT DOCUMENTS

| | | | |
|---|---|---|---|
| 7,373,790 | B2 | 5/2008 | Clare et al. |
| 8,505,332 | B1 | 8/2013 | Prim |
| 8,844,639 | B2 | 9/2014 | Gupta et al. |
| 9,488,040 | B2 | 11/2016 | Chakrabarty et al. |
| 9,534,836 | B2 | 1/2017 | Dubettier-Grenier et al. |
| 2005/0189112 | A1 | 9/2005 | Taylor et al. |
| 2006/0289166 | A1 | 12/2006 | Stromquist et al. |
| 2007/0000666 | A1 | 1/2007 | Vozniak et al. |
| 2007/0187340 | A1 | 8/2007 | Oresti et al. |
| 2008/0087041 | A1 | 4/2008 | Denton et al. |
| 2010/0032171 | A1* | 2/2010 | Bali .............. C09K 8/594 166/402 |
| 2012/0000660 | A1 | 1/2012 | Gatlin et al. |
| 2012/0037370 | A1* | 2/2012 | Johnson ........... E21B 36/00 166/303 |
| 2012/0047942 | A1 | 3/2012 | Kolodziej |
| 2013/0168086 | A1 | 7/2013 | Roberts |
| 2013/0199774 | A1* | 8/2013 | Sultenfuss ........ E21B 43/164 166/248 |
| 2013/0220605 | A1 | 8/2013 | Vandor |
| 2013/0299167 | A1 | 11/2013 | Fordyce et al. |
| 2014/0000899 | A1 | 1/2014 | Nevison |
| 2014/0124208 | A1 | 5/2014 | Loree et al. |
| 2014/0366577 | A1* | 12/2014 | Zubrin ............ F25J 3/0209 62/619 |
| 2015/0021022 | A1 | 1/2015 | Ladva et al. |
| 2015/0152318 | A1 | 6/2015 | Travis |
| 2015/0167550 | A1 | 6/2015 | Vandervort et al. |
| 2015/0184932 | A1* | 7/2015 | Higginbotham ........ F25J 3/08 62/620 |
| 2015/0233222 | A1 | 8/2015 | Teklu et al. |
| 2015/0368566 | A1 | 12/2015 | Young et al. |
| 2016/0238313 | A1* | 8/2016 | Shotts ............ C10L 3/12 |
| 2017/0044425 | A1* | 2/2017 | Barati Ghahfarokhi ................. C09K 8/594 |

FOREIGN PATENT DOCUMENTS

| | | |
|---|---|---|
| GB | 2219818 A | 12/1989 |
| WO | 2010025540 A1 | 3/2010 |
| WO | 2012097424 A1 | 7/2012 |
| WO | 2015020654 A1 | 2/2015 |
| WO | 2016064645 A1 | 4/2016 |

OTHER PUBLICATIONS

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1-5; table 2, Jan. 1, 1992.

Holtz et al., "Summary Integrated Geologic and Engineering Determination of Oil- Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Qing Sun et al., "Quantification of uncertainty in recovery efficiency predictions: lessons learned from 250 mature carbonate fields", SPE 84459, pp. 1-15, Jan. 1, 2005.

Rassenfoss; "In Search of the waterless fracture", JPT, Jun. 30, 2013, pp. 46-54, XP055237780.

International Search Report and Written Opinion dated Mar. 30, 2017, corresponding to Application No. PCT/US2016/067458.

* cited by examiner

MISCIBLE SOLVENT ASSISTED GRAVITY DRAINAGE

CROSS-REFERENCE TO RELATED APPLICATION

This application claims priority to U.S. Provisional Application Ser. No. 62/319,856, filed Apr. 8, 2016, which is incorporated by reference herein in its entirety.

FIELD

Embodiments of the disclosure relate to systems and methods for enhanced or improved oil recovery using a miscible solvent with assisted gravity drainage.

BACKGROUND

Estimates of worldwide oil in-place range up to 1.5 trillion barrels. Using that figure, since conventional recovery methods (primary and secondary) typically extract one-third of the original oil-in-place in a reservoir, it is estimated that the oil remaining as residual oil saturation after conventional recovery would be approximately 1.0 trillion barrels. Several enhanced oil recovery (EOR) techniques generally grouped together as tertiary production schemes have targeted this resource. In the past, chemical, thermal, and miscible techniques have been used by the industry. These EOR techniques typically involve injection of chemical compounds dissolved in water, the injection of steam, or the injection of a gas that is miscible with the oil in place.

The choice of EOR technique to be used is also dependent on other considerations such as depth, temperature, and amount of oil remaining in place. Much of the design phase of an EOR project is spent in the search for the combination of processes and injection schemes that will maximize oil recovery relative to the cost of implementing a particular technique. Most injection materials in use today have properties that differ considerably from the hydrocarbons in the reservoirs. Such differences in properties can reduce extraction efficiency.

Therefore there is a need for new and improved enhanced or improved oil recovery techniques.

SUMMARY

In one embodiment, a method for enhanced or improved oil recovery comprises injecting a miscible injection fluid through an injection well into a fractured carbonate reservoir having a high structural relief to initiate gravity-stable displacement and gas cap expansion processes that displace hydrocarbons from a structurally higher position to a structurally lower position within the fractured carbonate reservoir, wherein the miscible injection fluid comprises an unfractionated hydrocarbon mixture that is miscible with hydrocarbons in the fractured carbonate reservoir; and producing the displaced hydrocarbons through a production well that is disposed above an oil/water interface within the fractured carbonate reservoir.

DETAILED DESCRIPTION

Figure 1:
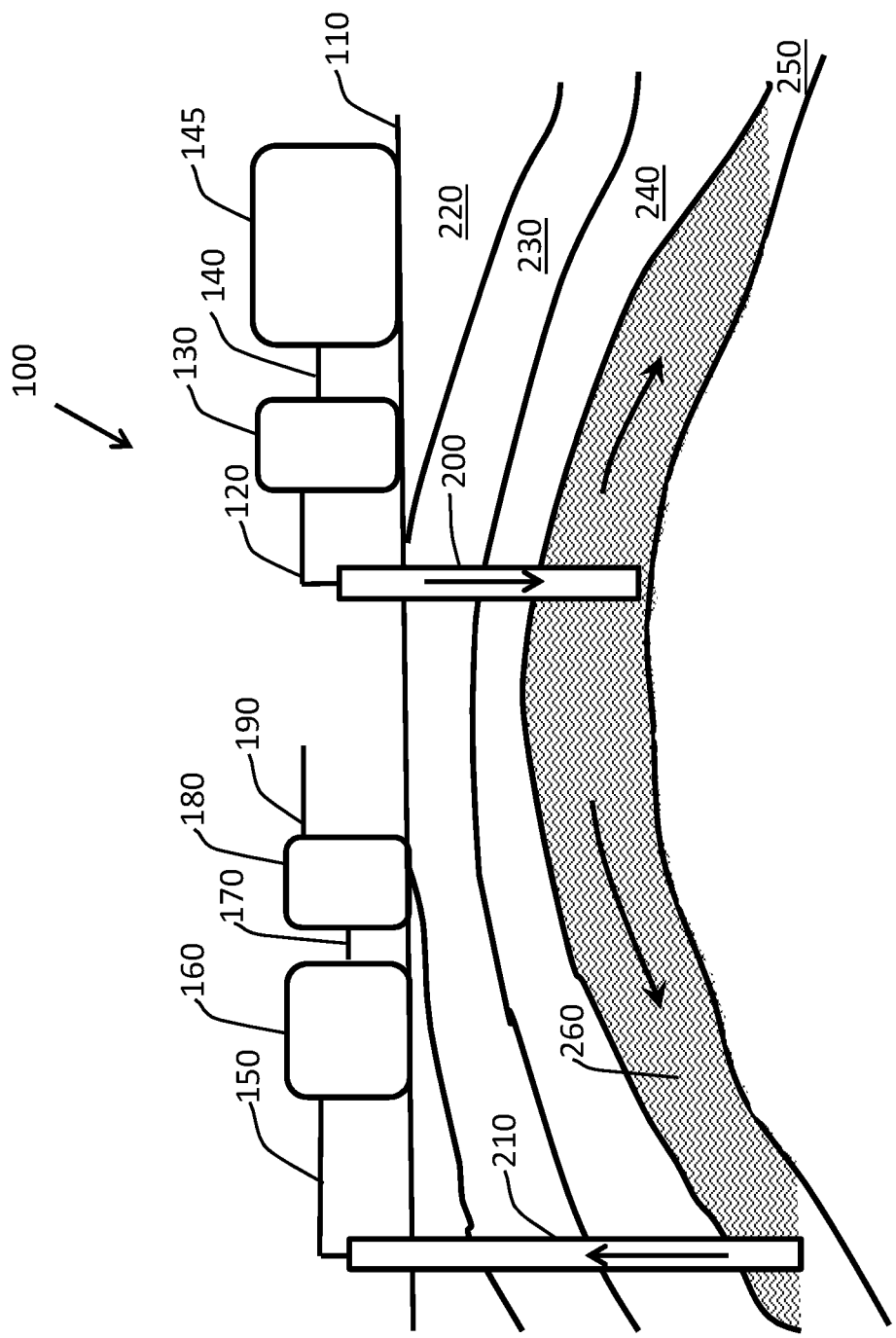
FIG. 1 is a section view of a hydrocarbon bearing reservoir according to one embodiment.

Embodiments of the disclosure include miscible injection fluids used for the enhanced or improved oil recovery of residual hydrocarbons from hydrocarbon bearing reservoirs. The miscible injection fluids comprise naturally occurring, locally available components as a cost effective approach. The miscible injection fluids help reduce and/or eliminate interfacial tension of the residual hydrocarbons to enhance or improve oil recovery.

In one embodiment, the miscible injection fluid may comprise an unfractionated hydrocarbon mixture, such as Y-Grade natural gas liquids (referred to herein as Y-Grade NGL). Y-Grade NGL is similar in viscosity to reservoir oils, which results in good sweep efficiencies when compared to hydrocarbon gases that are often considerably lower in viscosity than the reservoir oils. Sweep efficiencies can be further improved if Y-Grade NGL is injected into the reservoir in small volumes (also referred to as "slugs") that are alternated with slugs of water as a means of lowering the mobility of the injected fluids. Y-Grade NGL is a low cost miscible solvent that is an excellent candidate for miscible solvent enhanced or improved hydrocarbon recovery.

Y-Grade NGL is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline for example.

Typically, Y-Grade NGL is a by-product of de-methanized hydrocarbon streams that are produced from shale wells and transported to a centralized facility. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-12 percent, to allow the Y-Grade NGL to be transported as a liquid in low pressure storage vessels. According to another example, Y-Grade NGL may be processed to have a high ethane content, such as an ethane content within a range of 38-60 percent, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture must be sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises 30-80%, such as 40-60%, for example 43%, ethane, 15-45%, such as 20-35%, for example 27%, propane, 5-10%, for example 7%, normal butane, 5-40%, such as 10-25%, for example 10%, isobutane, and 5-25%, such as 10-20%, for example 13%, pentane plus. Methane is typically less than 1%, such as less than 0.5% by liquid volume.

In one embodiment, Y-Grade NGL comprises dehydrated, desulfurized wellhead gas condensed components that have a vapor pressure of not more than about 600 psig at 100 degrees Fahrenheit (° F.), with aromatics below about 1 weight percent, and olefins below about 1% by liquid volume. Materials and streams useful for the methods and systems described herein typically include hydrocarbons with melting points below about 0 degrees Fahrenheit (° F.).

In one embodiment, Y-Grade NGL may be mixed with a viscosity increasing agent, a nonionic surfactant, and/or a crosslinking agent. Y-Grade NGL may be mixed with the nonionic surfactant to create foam. The viscosity increasing agent, the nonionic surfactant, and/or the crosslinking agent may be mixed with a solubilizing fluid for subsequent mixture with the Y-Grade NGL. The solubilizing fluid may comprise fractionated or refined hydrocarbons, such as $C_3$, $C_4$, $C_5$, $C_6$, $C_7$, $C_8$, $C_9$, and mixtures thereof. The solubilizing fluid may comprise C3+ hydrocarbons, including propane, butane, pentane, naphtha, toluene, diesel, natural gasoline, and any combination thereof.

FIG. 1 is a schematic illustration of an enhanced or improved oil recovery system 100 disposed on surface 110 over a hydrocarbon bearing reservoir 250 according to one embodiment. The hydrocarbon bearing reservoir 250 is located below several formations. In particular, a first subsurface formation 220 is disposed above a second subsurface formation 230, which is disposed above a third subsurface formation 240. The first, second, and third subsurface formations are disposed above the hydrocarbon bearing reservoir 250.

An injection well 200 and a production well 210 are drilled through and traverse the first, second, and third subsurface formations 220-240 and terminate in the hydrocarbon bearing reservoir 250. The injection well 200 terminates at a location within the hydrocarbon bearing reservoir 250 that is higher (e.g. closer to the surface 210) than a location where the production well 210 terminates within the hydrocarbon bearing reservoir 250. Injection facilities are located on surface 110 and include one or more storage tanks 145 that are connected via line 140 to one or more injection pumps 130 to inject fluids into the injection well 200 via line 120. Production facilities are located on surface 110 and include one or more separators 160 that receive produced fluids from the production well 210 via line 150. The separators 160 separate liquids and gases from the produced fluids. The separated liquids are stored in one or more storage tanks 180 via line 170 and the separated gases are transported off via pipeline 190.

In one embodiment, a method of enhanced or improved oil recovery comprises injecting the miscible injection fluid 260 into the hydrocarbon bearing reservoir 250 at a structurally high position within the hydrocarbon bearing reservoir 250. A pressurized volume of miscible injection fluid 260 (such as Y-Grade NGL supplied from the storage tanks 145) is pumped down the injection well 200 and injected into the hydrocarbon bearing reservoir 250 at a pressure which the miscible injection fluid 260 remains miscible with liquid hydrocarbons in the hydrocarbon bearing reservoir 250. The method further comprises producing hydrocarbons from the production well 210 at a structurally low position within the hydrocarbon bearing reservoir 250.

The miscible injection fluid 260, due to gravity and buoyancy, initiates a gravity-stable displacement process and a gas cap expansion process that both mobilize and displace residual hydrocarbons from a structurally higher position to a structurally lower position in the hydrocarbon bearing reservoir 250 adjacent to the production well 210. Mobilized hydrocarbons, the miscible injection fluid 260, and/or other reservoir fluids (collectively referred to as "produced fluids") are produced to the surface 110 through the production well 210 and directed into the separators 160 via line 150, into the storage tanks 180 via line 170, and to the pipeline 190. Gas separated in the separators 160 is sent to the pipeline 190, while separated liquids (such as liquid hydrocarbons and water) are stored in the storage tanks 180.

Figure 2:
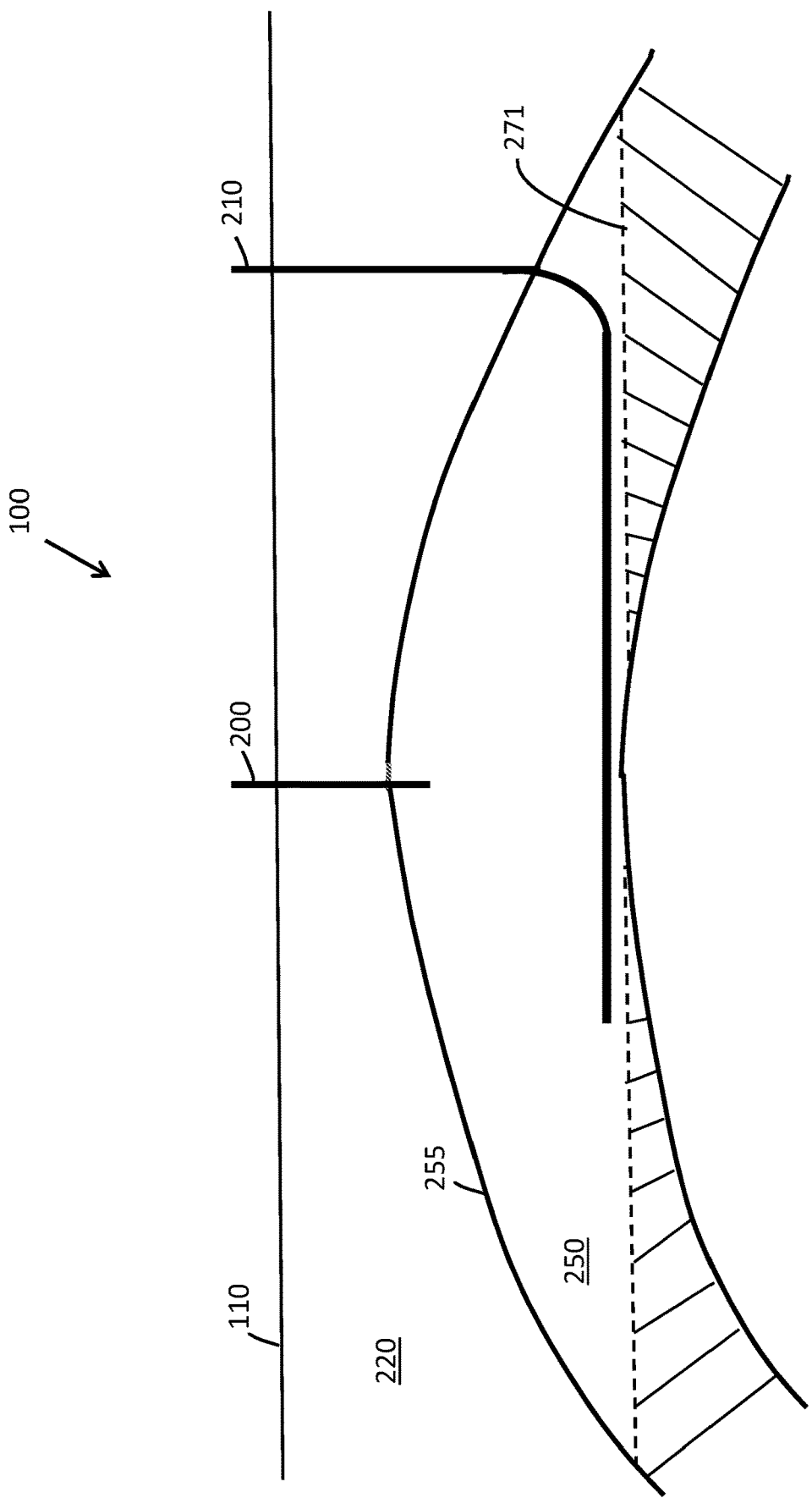
FIG. 2 is a section view of a hydrocarbon bearing reservoir according to one embodiment.

FIG. 2 is a schematic illustration of an enhanced or improved oil recovery system 100 disposed on surface 110 over a hydrocarbon bearing reservoir 250 according to one embodiment. The hydrocarbon bearing reservoir 250 is located below a first subsurface formation 220. An array of vertical injection wells 200 and an array of horizontal production wells 210 are disposed through the first subsurface formation 220 and terminate in the hydrocarbon bearing reservoir 250. The vertical injection wells 200 terminate at a location within the hydrocarbon bearing reservoir 250 that is higher (e.g. closer to the surface 110) than a location where the horizontal production wells 210 terminate within the hydrocarbon bearing reservoir 250. The vertical injection wells 200 extend just below a high structural relief 255 (e.g. a steeply dipping structure or formation) of the hydrocarbon bearing reservoir 250. At least a horizontal section of the horizontal production wells 210 is positioned within the hydrocarbon bearing reservoir 250 at a location below the vertical injection wells 200 but above an oil-water interface 270.

Figure 3:
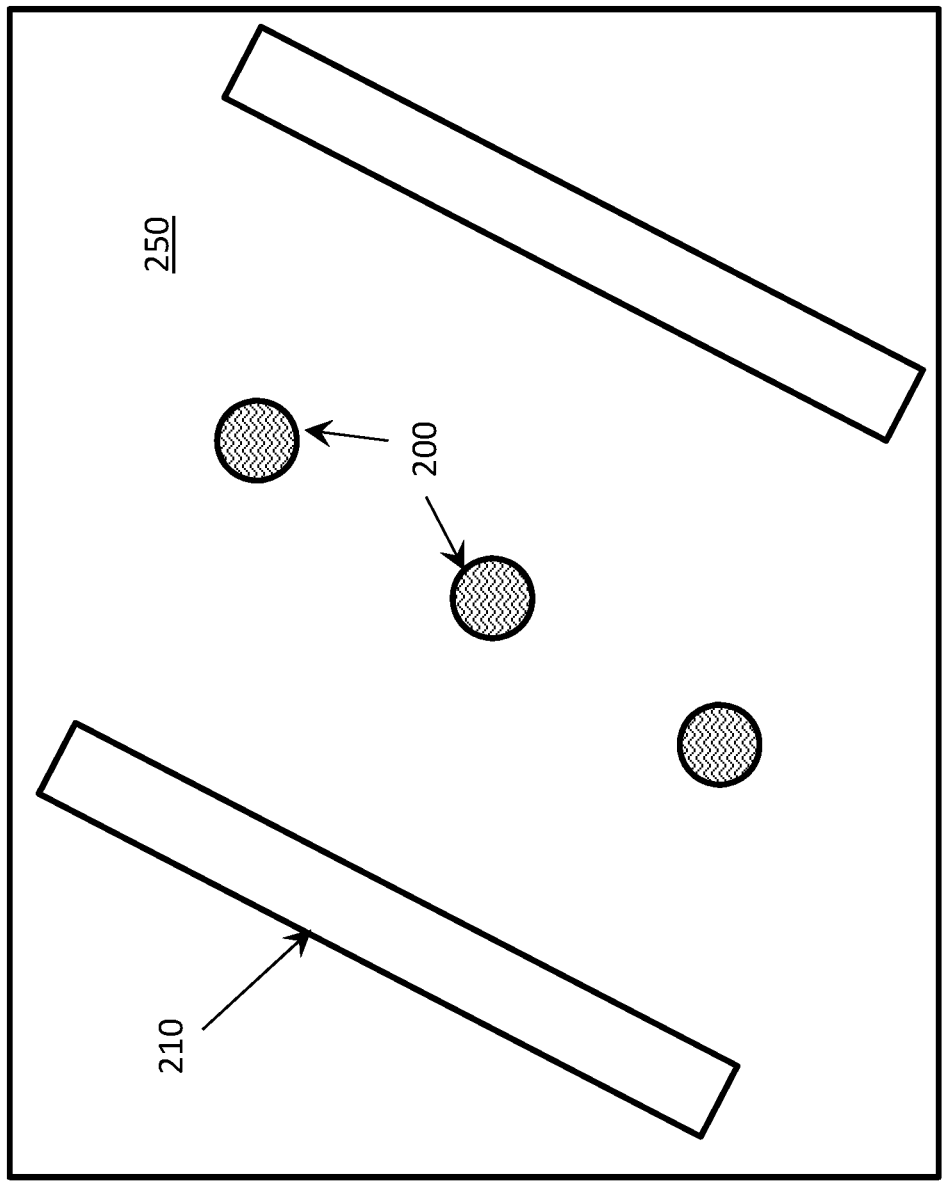
FIG. 3 is a plan view of the hydrocarbon bearing reservoir shown in FIG. 2 according to one embodiment.

FIG. 3 is a plan view of hydrocarbon bearing reservoir 250 illustrating the array of vertical injection wells 200 and the array of horizontal production wells 210. As shown, there are 3 vertical injection wells 200 that are aligned with each other, but that are offset from and disposed between 2 horizontal production wells 210.

Figure 4:
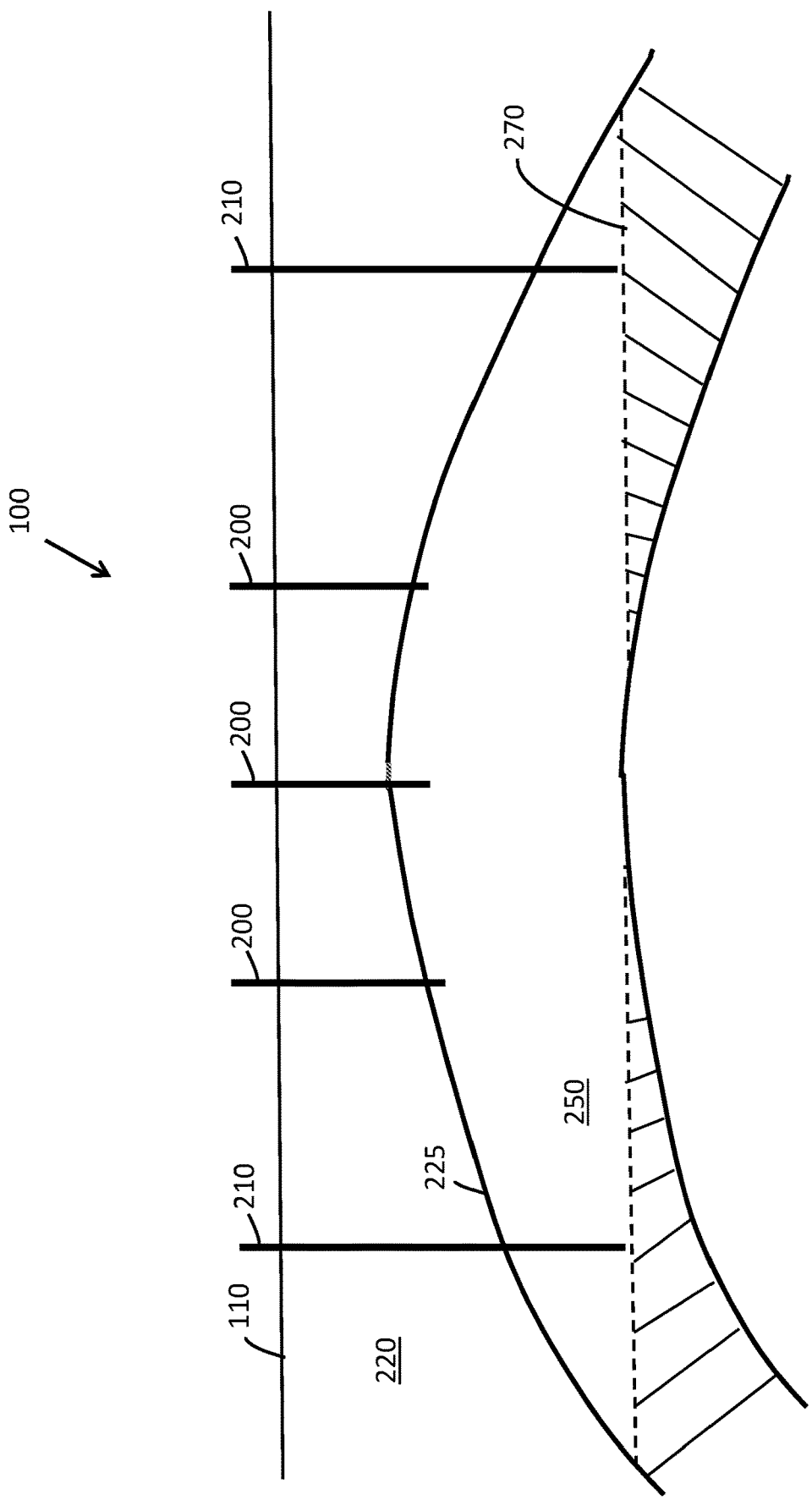
FIG. 4 is a section view of a hydrocarbon bearing reservoir according to one embodiment.

FIG. 4 is a schematic illustration of an enhanced or improved oil recovery system 100 disposed on surface 110 over a hydrocarbon bearing reservoir 250 according to one embodiment. The hydrocarbon bearing reservoir 250 is located below a first subsurface formation 220. An array of vertical injection wells 200 and an array of vertical production wells 210 are disposed through the first subsurface formation 220 and terminate in the hydrocarbon bearing reservoir 250. The vertical injection wells 200 terminate at a location within the hydrocarbon bearing reservoir 250 that is higher (e.g. closer to the surface 110) than a location where the vertical production wells 210 terminate within the hydrocarbon bearing reservoir 250. The vertical injection wells 200 extend just below a structural relief 225 of the hydrocarbon bearing reservoir 250. The vertical production wells 210 are positioned within the hydrocarbon bearing reservoir 250 at a location below the vertical injection wells 200 but above an oil-water interface 270.

Figure 5:
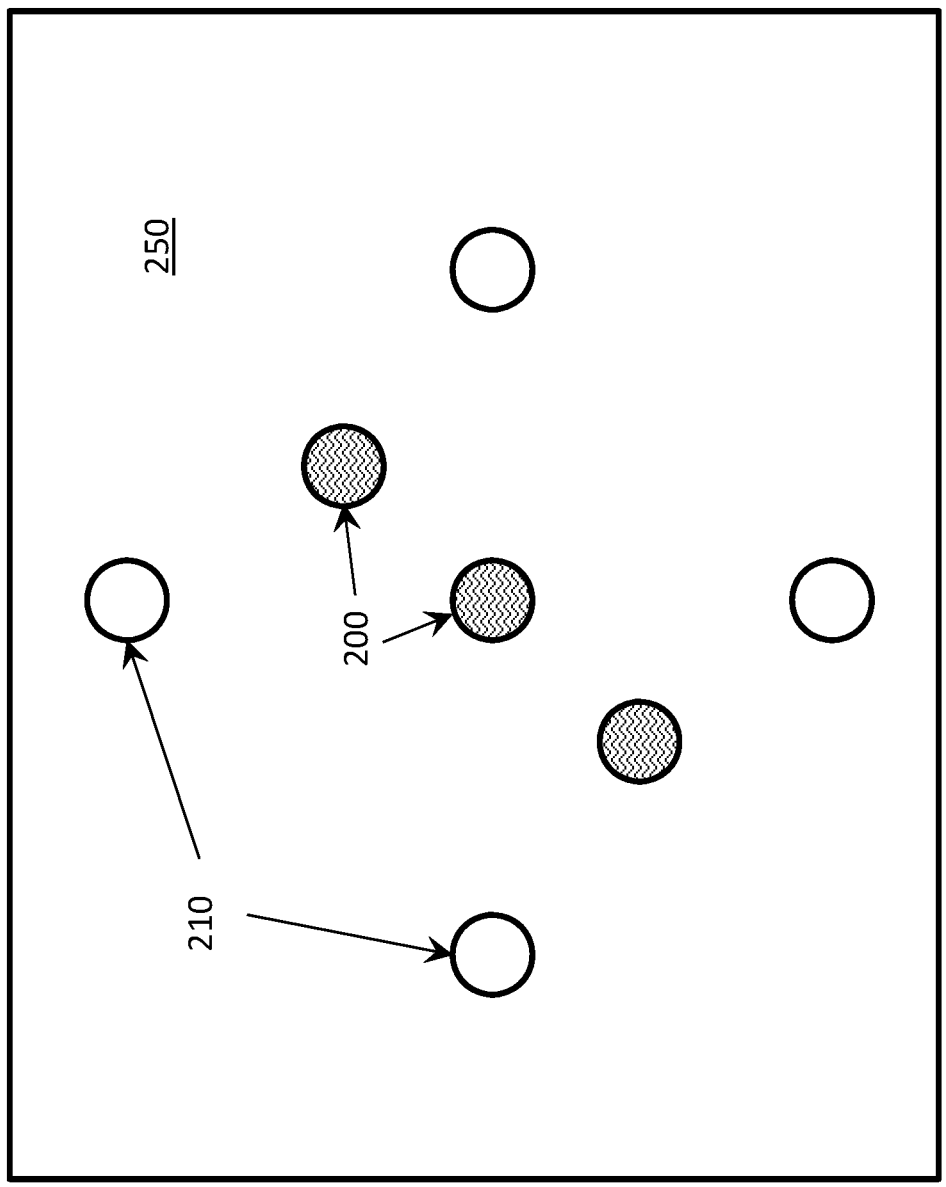
FIG. 5 is a plan view of the hydrocarbon bearing reservoir shown in FIG. 4 according to one embodiment.

FIG. 5 is a plan view of hydrocarbon bearing reservoir 250 illustrating the array of vertical injection wells 200 (denoted with internal patterning) and the array of vertical production wells 210 (denoted with internal patterning). As shown, there are 3 vertical injection wells 200 that are aligned with each other, but that are offset from and disposed between 4 horizontal production wells 210.

Figure 6:
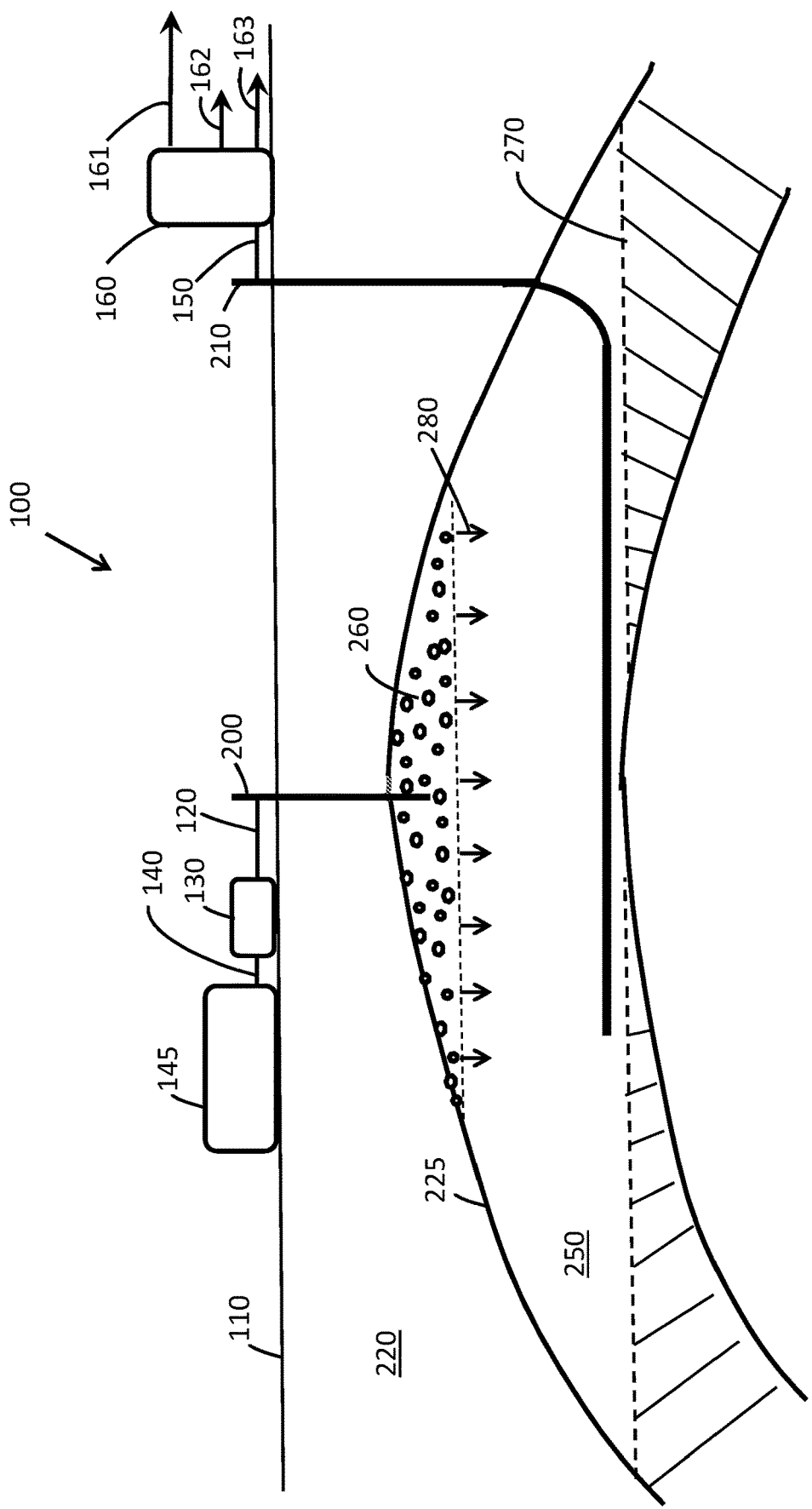
FIG. 6 is a section view of a hydrocarbon bearing reservoir according to one embodiment.

FIG. 6 is a schematic illustration of an enhanced or improved oil recovery system 100 disposed on surface 110 over a hydrocarbon bearing reservoir 250 according to one embodiment. The hydrocarbon bearing reservoir 250 is located below a first subsurface formation 220. An array of vertical injection wells 200 and an array of horizontal production wells 210 are disposed through the first subsurface formation 220 and terminate in the hydrocarbon bearing reservoir 250. The vertical injection wells 200 terminate at a location within the hydrocarbon bearing reservoir 250 that is higher (e.g. closer to the surface 110) than a location where the horizontal production wells 210 terminate within the hydrocarbon bearing reservoir 250. The vertical injection wells 200 extend just below a high structural relief 255 (e.g. a steeply dipping structure or formation) of the hydrocarbon bearing reservoir 250. At least a horizontal section of the horizontal production wells 210 is positioned within the hydrocarbon bearing reservoir 250 at a location below the vertical injection wells 200 but above an oil-water interface 270.

Injection facilities are located on surface 110 and include one or more storage tanks 145 that are connected via line 140 to one or more injection pumps 130 to inject fluids into the vertical injection wells 200 via line 120. Production facilities are located on surface 110 and include one or more separators 160 that receive produced fluids from the horizontal production wells 210 via line 150. The separators 160 separate liquids and gases from the produced fluids. Separated water flows through line 161 to a water treatment and storage facility, separated liquid hydrocarbons flows through line 162 to a liquid hydrocarbons storage facility, and separated gases flows through line 163 to a gas gathering system.

In one embodiment, a method of enhanced or improved oil recovery comprises injecting the miscible injection fluid 260 into the hydrocarbon bearing reservoir 250 at a structurally high position within the hydrocarbon bearing reservoir 250. A pressurized volume of miscible injection fluid 260 (such as Y-Grade NGL supplied from the storage tanks 145) is pumped down the vertical injection well 200 and injected into the hydrocarbon bearing reservoir 250 at a pressure which the miscible injection fluid 260 remains miscible with liquid hydrocarbons in the hydrocarbon bearing reservoir 250. The method further comprises producing hydrocarbons from the horizontal production well 210 at a structurally low position within the hydrocarbon bearing reservoir 250.

As the result of gravity and buoyancy, the lighter weight (e.g. less dense) miscible injection fluid 260 rises vertically above the heavier weight (e.g. more dense) hydrocarbons in the hydrocarbon hearing reservoir 250 where it accumulates in a structurally high position within the hydrocarbon bearing reservoir 250. As the volume of the miscible injection fluid 260 that accumulates and expands (e.g. gas cap expansion) in the structurally high position increases, the heavier weight hydrocarbons are forced downward (e.g. gravity drainage). The miscible injection fluid 260, with the assistance of gravity and buoyancy, mobilizes and displaces residual hydrocarbons (identified by reference arrows 280) in the hydrocarbon bearing reservoir 250 from the structurally higher position downward to a structurally lower position adjacent to the production well 210. Mobilized hydrocarbons, the miscible injection fluid 260, and/or other reservoir fluids (collectively referred to as "produced fluids") are produced to the surface 110 through the horizontal production wells 210 and directed into the separators 160 via line 150.

Figure 7:
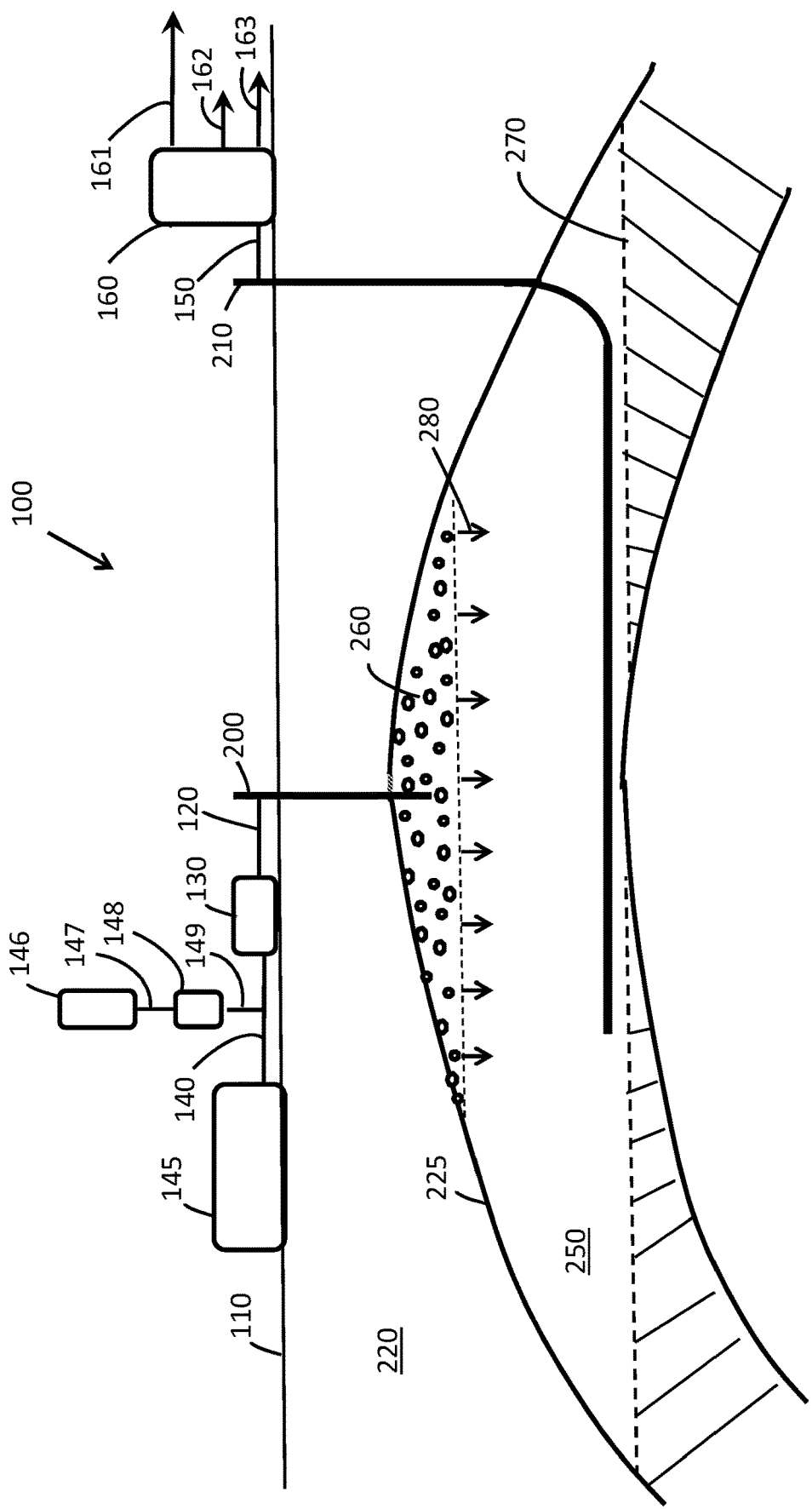
FIG. 7 is a section view of a hydrocarbon bearing reservoir according to one embodiment.

FIG. 7 is a schematic illustration of an enhanced or improved oil recovery system 100 disposed on surface 110 over a hydrocarbon bearing reservoir 250 according to one embodiment. The system 100 shown in FIG. 7 is similar to the system 100 shown in FIG. 6 but further includes one or more chemical storage tanks 146 connected via line 147 to one or more dosing pumps 148, which are connected via line 149 to line 140. A viscosity reducing agent, a nonionic surfactant, and/or a crosslinking agent in the chemical storage tanks 146 is discharged into the dosing pumps 148 via line 147 and into line 140 via line 149, where it mixes with the miscible injection fluid 260. The miscible injection fluid 260 when mixed with a nonionic surfactant may form foam for injection into the hydrocarbon bearing reservoir 250. The pressurized, chemically laden miscible injection fluid 260 is discharged from the pumps 130 via line 120 into the vertical injection wells 200 and injected at a structurally high position within the hydrocarbon bearing reservoir 250. As the result of buoyancy, the pressurized, chemically laden miscible injection fluid 260 rises vertically where it accumulates in a structurally high position within the hydrocarbon bearing reservoir 250 and initiates gravity-stable displacement and gas cap expansion processes as discussed above.

Figure 8:
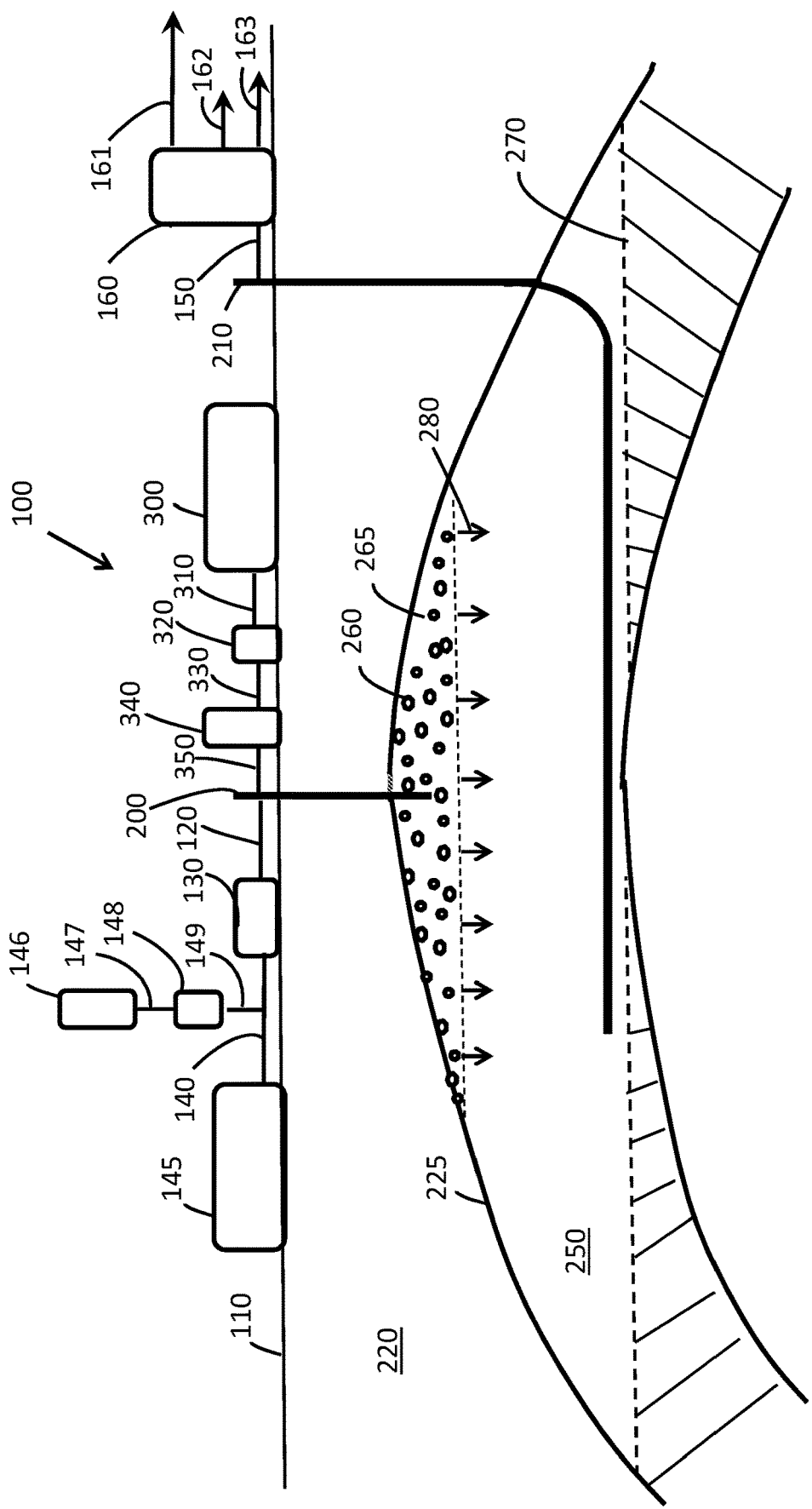
FIG. 8 is a section view of a hydrocarbon bearing reservoir according to one embodiment.

FIG. 8 is a schematic illustration of an enhanced or improved oil recovery system 100 disposed on surface 110 over a hydrocarbon bearing reservoir 250 according to one embodiment. The system 100 shown in FIG. 8 is similar to the system 100 shown in FIG. 7 but further includes one or more storage tanks 300 connected via line 310 to one or more cryogenic pumps 320, which are connected via line 330 to one or more vaporizers 340.

A mobility control fluid 265 (initially stored as a liquefied gas for example) in the storage tanks 300 is discharged into the cryogenic pumps 320 via line 310 where it is pressurized and cooled, and then discharged into the vaporizers 340 via line 330 where it is vaporized into gas. The mobility control fluid 265 is then discharged into injection well 200 via line 350, where it mixes with the pressurized, chemically laden miscible injection fluid 260 for simultaneous injection at a structurally high position within the hydrocarbon bearing reservoir 250. As the result of gravity and buoyancy, the mobility control fluid 265 (e.g. vaporized gas) and the pressurized, chemically laden miscible injection fluid 260 rise vertically where they accumulate and expand in a structurally high position within the hydrocarbon bearing reservoir 250 and initiate gravity-stable displacement and gas cap expansion processes as discussed above.

In one embodiment, injections of the miscible injection fluid 260 may be pumped simultaneously with injections of the mobility control fluid 265 into the hydrocarbon bearing reservoir 250 to inhibit or prevent breakthrough of the miscible injection fluid 260 from the injection wells 200 to the production wells 210. In one embodiment, injections of the miscible injection fluid 260 may be alternated with injections of the mobility control fluid 265 within the hydrocarbon bearing reservoir 250 to inhibit or prevent breakthrough of the miscible injection fluid 260 from the injection wells 200 to the production wells 210.

In one embodiment, injections of the miscible injection fluid 260 mixed with the mobility control fluid 265 may be alternated with injections of the same or different mobility control fluid 265 only within the hydrocarbon bearing reservoir 250 to inhibit or prevent breakthrough of the miscible injection fluid 260 from the injection wells 200 to the production wells 210. In one embodiment, injections of the miscible injection fluid 260 mixed with the mobility control fluid 265 may be alternated with injections of the same or different miscible injection fluid 260 only within the hydrocarbon bearing reservoir 250 to inhibit or prevent breakthrough of the miscible injection fluid 260 from the injection wells 200 to the production wells 210.

The time periods at which the miscible injection fluid 260 and the mobility control fluid 265 are injected into the hydrocarbon bearing reservoir 250 may be the same, greater than, or less than each other. The total volume (or defined volumes) of the miscible injection fluid 260 and the mobility control fluid 265 that are injected into the hydrocarbon bearing reservoir 250 may be the same, greater than, or less than each other. The mobility control fluid 265 may be a liquid or a gas. The mobility control fluid 265 may comprise water, carbon dioxide, nitrogen, or any combination thereof.

In one embodiment, any of the injection wells 200 discussed above may be a vertical well or a horizontal well. In one embodiment, any of the production wells 210 discussed above may be a vertical well or a horizontal well. In one embodiment, the injection wells 200 and/or the production wells 210 may be all vertical wells, all horizontal wells, or a combination of vertical and horizontal wells.

In one embodiment, the viscosity of the hydrocarbons in the hydrocarbon bearing reservoir 250 prior to injection of the miscible injection fluid 260 may be about 5 centipoise to about 100,000 centipoise. In one embodiment, the permeability of the hydrocarbon bearing reservoir 250 prior to injection of the miscible injection fluid 260 may be about 0.0001 Darcies to about 10 Darcies. In one embodiment, the injection pressure of the miscible injection fluid 260 may be about 0 psi (or head pressure of the fluid) to about 10,000 psi.

In one embodiment, the miscible injection fluid 260 may comprise Y-Grade NGL, carbon dioxide, nitrogen, or any combination thereof. In one embodiment, carbon dioxide and/or nitrogen may be injected into line 120 or line 140 and mixed with the miscible injection fluid 260 (such as Y-Grade NGL) supplied from the storage tanks 145 for injection into the hydrocarbon bearing reservoir 250. In one embodiment, carbon dioxide and/or nitrogen may be premixed with the miscible injection fluid 260 (such as Y-Grade NGL) in the storage tanks 145 for injection into the hydrocarbon bearing reservoir 250.

In one embodiment, the miscible injection fluid 260 and/or the mobility control fluid 265 may be injected into the hydrocarbon bearing reservoir 250 through the injection well 200 at the same time that (simultaneously as) the produced fluids are being recovered back to the surface through the production well 210, while maintaining a pressure and/or a temperature within the hydrocarbon bearing reservoir 250 at which the miscible injection fluid 260 remains miscible with the liquid hydrocarbons in the hydrocarbon bearing reservoir 250. In one embodiment, the pressure and/or temperature within the hydrocarbon bearing reservoir 250 at which the miscible injection fluid 260 remains miscible with the liquid hydrocarbons in the hydrocarbon bearing reservoir 250 is above the dew point of the miscible injection fluid 260.

In one embodiment, the miscible injection fluid 260 may be mixed with a viscosity increasing agent, a nonionic surfactant, and/or a crosslinking agent. The viscosity increasing agent may comprise phosphate esters, amine carbamates, aluminum soaps, cocoamine (C12-C14), sebacoyl chloride, oley (C18) amine, toulen-2, 4-diisocyanate, tolune-2, 6-diisolcyanate, and any combination thereof. The nonionic surfactant may be mixed with the miscible injection fluid to create foam. The crosslinking agent may comprise organometallic complex cross-linkers. The crosslinking agent may comprise boron.

In one embodiment, a solubilizing fluid may be mixed with the viscosity increasing agent, the nonionic surfactant, and/or the crosslinking agent to solubilize the viscosity increasing agent, the nonionic surfactant, and/or the crosslinking agent for subsequent mixing with the miscible injection fluid 260. The solubilizing fluid may comprise fractionated or refined hydrocarbons, such as $C_3$, $C_4$, $C_5$, $C_6$, $C_7$, $C_8$, $C_9$, and any combination thereof. The solubilizing fluid may comprise C3+ hydrocarbons, such as propane, butane, pentane, naphtha, toluene, diesel, natural gasoline, and any combination thereof.

In one embodiment, the hydrocarbon bearing reservoir 250 may be a previously treated reservoir. In one embodiment, the hydrocarbon bearing reservoir 250 may be a previously fractured reservoir. In one embodiment, the hydrocarbon bearing reservoir 250 may be a fractured carbonate reservoir having a high structural relief (e.g. a steeply dipping structure or formation).

While the foregoing is directed to certain embodiments, other and further embodiments may be devised without departing from the basic scope of this disclosure.

We claim:

1. A method for enhanced or improved oil recovery, comprising:
  injecting an unfractionated hydrocarbon liquid miscible injection fluid through an injection well into a fractured carbonate reservoir having a high structural relief to initiate gravity-stable displacement and gas cap expansion processes that displace hydrocarbons from a structurally higher position to a structurally lower position within the fractured carbonate reservoir, wherein the unfractionated hydrocarbon liquid miscible injection fluid is miscible with hydrocarbons in the fractured carbonate reservoir, wherein the unfractionated hydrocarbon liquid miscible injection fluid is a byproduct of a condensed and de-methanized hydrocarbon stream, wherein the unfractionated hydrocarbon liquid miscible injection fluid is condensed out of the hydrocarbon stream at a temperature at or below 0 degrees Fahrenheit, and wherein the unfractionated hydrocarbon liquid miscible injection fluid comprises at least ethane, propane, butane, isobutane, pentane plus, and less than 1 percent methane by liquid volume; and producing the displaced hydrocarbons through a production well that is disposed above an oil/water interface within the fractured carbonate reservoir.

2. The method of claim 1, wherein the injection well comprises an array of vertical injection wells, and wherein the production well comprises an array of vertical production wells offset from the array of vertical injection wells.

3. The method of claim 1, wherein the injection well comprises an array of vertical injection wells, and wherein the production well comprises an array of horizontal production wells offset from the array of vertical injection wells.

4. The method of claim 1, further comprising injecting a mobility control fluid comprising carbon dioxide through the injection well into the fractured carbonate reservoir.

5. The method of claim 4, further comprising simultaneously injecting the miscible injection fluid with the mobility control fluid into the fractured carbonate reservoir.

6. The method of claim 1, further comprising injecting a mobility control fluid comprising nitrogen through the injection well into the fractured carbonate reservoir.

7. The method of claim 6, further comprising simultaneously injecting the miscible injection fluid with the mobility control fluid into the fractured carbonate reservoir.

8. The method of claim 1, further comprising injecting a mobility control fluid comprising water through the injection well into the fractured carbonate reservoir.

9. The method of claim 8, further comprising simultaneously injecting the miscible injection fluid with the mobility control fluid into the fractured carbonate reservoir.

10. The method of claim 1, wherein the viscosity of hydrocarbons in the fractured carbonate reservoir is between 5 centipoise to 100,000 centipoise.

11. The method of claim 1, wherein the injection pressure of the miscible injection fluid is between 0 psi to 10,000 psi.

12. The method of claim 1, wherein the permeability of the fractured carbonate reservoir is between 0.0001 Darcies and 10 Darcies.

13. The method of claim 1, further comprising mixing at least one of a viscosity increasing agent, a nonionic surfactant, and a cross-linking agent with the miscible injection fluid for injection into the fractured carbonate reservoir.

14. The method of claim 1, further comprising mixing a nonionic surfactant with the miscible injection fluid to create foam for injection into the fractured carbonate reservoir.

15. The method of claim 1, further comprising simultaneously injecting a mobility control fluid comprising at least one of carbon dioxide, nitrogen, and water with the miscible injection fluid into the fractured carbonate reservoir.

16. The method of claim 15, further comprising injecting the same or a different mobility control fluid only into the fractured carbonate reservoir.

17. A method for enhanced or improved oil recovery, comprising:

injecting an unfractionated hydrocarbon liquid miscible injection fluid through an injection well into a fractured carbonate reservoir having a high structural relief to initiate gravity-stable displacement and gas cap expansion processes that displace hydrocarbons from a structurally higher position to a structurally lower position within the fractured carbonate reservoir, wherein the unfractionated hydrocarbon liquid miscible injection fluid is a byproduct of a condensed and de-methanized hydrocarbon stream, wherein the unfractionated hydrocarbon liquid miscible injection fluid comprises 30 to 80 percent ethane, 15 to 45 percent propane, 5 to 10 percent butane, 5 to 40 percent isobutane, 5 to 25 percent pentane plus, and less than 1 percent methane by liquid volume, and wherein the total percent of all components present in the unfractionated hydrocarbon liquid miscible injection fluid does not exceed 100 percent; and producing the displaced hydrocarbons through a production well that is disposed above an oil/water interface within the fractured carbonate reservoir.

18. The method of claim 17, further comprising injecting a mobility control fluid comprising at least one of carbon dioxide, nitrogen, and water with the unfractionated hydrocarbon liquid miscible injection fluid into the fractured carbonate reservoir.

19. The method of claim 17, further comprising mixing at least one of a viscosity increasing agent, a nonionic surfactant, and a cross-linking agent with the unfractionated hydrocarbon liquid miscible injection fluid for injection into the fractured carbonate reservoir.

20. The method of claim 17, further comprising mixing a nonionic surfactant with the unfractionated hydrocarbon liquid miscible injection fluid to create foam for injection into the fractured carbonate reservoir.

* * * * *